(12) United States Patent
Josefiak

(10) Patent No.: US 9,268,312 B2
(45) Date of Patent: Feb. 23, 2016

(54) CHANGING THE OPERATING MODE OF AN ELECTRONIC DEVICE ASSOCIATED WITH A TRANSPORT UNIT

(71) Applicant: Frank Josefiak, Bonn Bad Godesberg (DE)

(72) Inventor: Frank Josefiak, Bonn Bad Godesberg (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 14/155,907

(22) Filed: Jan. 15, 2014

(65) Prior Publication Data

US 2014/0125452 A1    May 8, 2014

Related U.S. Application Data

(63) Continuation of application No. PCT/EP2012/064066, filed on Jul. 18, 2012.

(30) Foreign Application Priority Data

Jul. 19, 2011    (EP) ..................... 11174471

(51) Int. Cl.
    *G06K 19/07*    (2006.01)
    *G05B 1/01*     (2006.01)
    *B65D 88/14*    (2006.01)
    *G06Q 10/00*    (2012.01)
    (Continued)

(52) U.S. Cl.
    CPC *G05B 1/01* (2013.01); *B65D 88/14* (2013.01); *G06Q 10/00* (2013.01); *G06Q 10/08* (2013.01); *B64D 9/00* (2013.01); *B65D 2590/0083* (2013.01)

(58) Field of Classification Search
    CPC .. B65D 88/14; B65D 2590/0083; G05B 1/01; G06Q 10/08; G06Q 10/00; B64D 9/00; B64D 11/0015; G08C 17/02; G08C 19/28; G08C 2201/20; G08C 23/04; G08C 2201/92; B60R 25/24; G01V 15/00; G06K 7/0008; G06K 7/10128
    USPC .................................................. 340/4.3, 4.34
    See application file for complete search history.

(56) References Cited

U.S. PATENT DOCUMENTS

| 6,205,956 | B1 * | 3/2001 | Dickie et al. ................... 119/792 |
| 6,281,797 | B1 * | 8/2001 | Forster et al. .............. 340/572.3 |
| 7,791,455 | B1 |   9/2010 | MacLean, III et al. |

(Continued)

FOREIGN PATENT DOCUMENTS

| EP | 0 541 928 A1 | 5/1993 |
| EP | 1 069 540 A2 | 1/2001 |

(Continued)

*Primary Examiner* — Omer S Khan
(74) *Attorney, Agent, or Firm* — Reinhart Boerner Van Deuren P.C.

(57) ABSTRACT

It is inter alia disclosed an apparatus (1; 3) with a detecting means (2) for detecting whether a transport unit (4) to be transported by a vehicle is secured by at least one securing means (5; 7) against a movement in at least one direction relative to the vehicle, and with a means (10; 30) for changing an operating mode of an electronic device associated with the transport unit (4) depending upon a result of the detecting, or for outputting a signal for changing the operating mode depending on a result of the detecting. Moreover, a corresponding method (200; 300; 400), a corresponding computer program and an apparatus (1') for receiving the output signal and for changing the operating mode on the basis of the received signal are disclosed.

19 Claims, 6 Drawing Sheets

(51) Int. Cl.
*G06Q 10/08* (2012.01)
*B64D 9/00* (2006.01)

(56) References Cited

U.S. PATENT DOCUMENTS

2007/0090117 A1* 4/2007 Terry ........................... 220/628
2008/0111679 A1   5/2008 Ogg et al.
2008/0246316 A1* 10/2008 Carine et al. ............ 297/216.11
2008/0271651 A1* 11/2008 Sikora et al. ................... 109/25
2012/0042961 A1*  2/2012 Anderson et al. ............ 137/172

FOREIGN PATENT DOCUMENTS

| GB | 2 043 584 A | 10/1980 |
| WO | WO 00/08287 A1 | 2/2000 |
| WO | WO 2004/064003 A1 | 7/2004 |
| WO | WO 2004/078601 A2 | 9/2004 |

\* cited by examiner

CHANGING THE OPERATING MODE OF AN ELECTRONIC DEVICE ASSOCIATED WITH A TRANSPORT UNIT

CROSS-REFERENCE TO RELATED PATENT APPLICATIONS

This patent application is a continuation of PCT/EP2012/064066, filed Jul. 18, 2012, which claims priority to EP Application No. 11174471.0, filed Jul. 19, 2011, the entire teachings and disclosure of which are incorporated herein by reference thereto.

FIELD OF THE INVENTION

The present invention concerns an apparatus, a method and a computer program for changing an operating mode of an electronic device that is associated with a transport unit to be transported by a vehicle, in particular of an electronic device with a radio component, said electronic device being associated with a transport unit to be transported by an aircraft.

BACKGROUND OF THE INVENTION

Recently, real-time monitoring of transport goods has been gaining importance. To accomplish this monitoring, the transport goods themselves or transport units that can be used to transport one or more transport goods are equipped with electronic devices that detect variables affecting the transport goods and can transmit them wirelessly (e.g. via cellular mobile radio systems) to a control center from which they can e.g. be queried by the logistics company responsible for the transport or by the customer. These variables include the current location of the transport good (tracking), current temperature, information about vibrations, current humidity or current light exposure, to name only a few examples. These variables can also be collected over time intervals and then be provided in the form of a profile (either by the electronic devices themselves or by the control center).

This real-time monitoring provides a number of advantages:

Identification and avoidance of deviations of the variables from their desired target status: for example, loading a transport unit into a wrong vehicle or keeping a transport unit for too long in a location with too much sunlight can be identified.

Increasing security: for example, unauthorized access to the transport goods can be identified in real time and automatically trigger alarms to the customer and/or logistics company, e.g. by SMS or email.

Compliance with evidence obligations of a legal nature: for example, for temperature-managed transports for which the customer or logistics company must demonstrate that certain temperature limits were complied with during transport, this demonstration can be provided in real time.

Improving processes for the logistics company: the logistics company can measure and benchmark their transport processes and individual components thereof in real time. Until now, this has only been possible with considerable work and high costs, if at all.

Liability relief

Reduction in insurance totals

Expansion of the transport portfolio

Currently, however, there is no option available for monitoring air freight transports in real time. This is due to the fact that a necessary part of real-time monitoring is the radio-based transmission of the transport goods' variables by the electronic devices with which the transport goods or transport units are equipped. Radio-based applications that are to be used in aircraft are, however, subject to certification by the responsible aviation authority, such as the European Aviation Safety Agency (EASA) and Federal Aviation Administration (FAA). Both these authorities are currently refusing to allow aircraft transport of actively transmitting units that are not under the control of the flight operator.

The basis for issuing permission for such units to be transported in aircraft could, however, be a forced shutdown of these units or at least a forced deactivation of these units' radio modules during the entire flight, ruling out interference with the aircraft's internal radio and control systems.

SUMMARY OF THE INVENTION

It is inter alia an object of the present invention to overcome the above-mentioned disadvantages.

To accomplish this, the invention takes a robust pathway that could be called "fail safe" and is moreover simple in design.

Disclosures in this regard include apparatuses according to claims 1 and 13, a method according to claim 14 and a computer program according to claim 15. Advantageous embodiments can be taken from the dependent claims.

An example of an apparatus in accordance with the invention comprises a detecting means for detecting whether a transport unit to be transported by a vehicle is secured by at least one securing means against a movement in at least one direction relative to the vehicle.

The vehicle can be a land, water or air vehicle, such as a truck, a train, a ship or an aircraft.

The transport unit can be configured for transport in, on, above or under the vehicle, for example. The transport unit can hold e.g. one or multiple transport goods (such as packages).

The transport unit can e.g. be in the form of a load unit (unit load device, ULD), such as a container or palette.

The securing means can be part of the vehicle. They can for example be permanently or detachably connected to the vehicle. Examples for securing means include securing catches or clips (e.g. for ULDs) that prevent a movement of the transport unit in at least one direction relative to the vehicle. These securing means can e.g. be activated (automatically or manually, e.g. by raising it from a floor level of the vehicle or by guiding it towards the transport unit) when a transport unit has reached its transport position in the vehicle. A transport unit with a rectangular contour can e.g. be prevented from horizontal movement by at least four securing means (one securing means on each side). Special design of the securing means, e.g. such that the securing means partially overlap at least a part (such as a base plate) of the transport unit, can furthermore prevent a vertical movement of the transport unit.

The detecting means are configured to detect whether the transport unit is secured by at least one securing means against a movement in at least one direction relative to the vehicle. The detecting means can comprise sensor means and analysis means, for example. The sensor means can be configured e.g. to respond to successful securement by changing a physical property of the sensor means (such as an electric resistance) or by outputting a signal (such as a voltage pulse). The analysis means can e.g. be connected by wire or be wirelessly connected to the sensor means and can be configured to analyze the change in physical property or the output signal, e.g. to determine whether securement has occurred.

That can be the case, for example, when the change in physical property or the output signal exceeds a predefined threshold.

The detecting can, for example, be based on a contact between the securing means and at least a part of the transport unit that takes place when the transport unit is secured by the securing means. Alternatively, the detecting can e.g. be based on a force exerted by the securing means on at least a part of the detecting means arranged between the securing means and at least a part of the transport unit (e.g. on at least a part of the sensor means) when the transport unit is secured by the securing means.

Here, for example, it would be possible to make the system only detect whether the transport unit was secured at all by at least one securing means.

Alternatively, for example, it also is possible to detect how many securing means were securing the transport unit. For each securing means, for example, it is possible to only detect that the transport unit had been secured against a movement in at least one direction relative to the vehicle by that securing means. Alternatively, it can also be detected how many and/or in what directions one or more securing means were providing a securement of the transport unit.

Examples of the apparatus according to this invention moreover include means for changing an operating mode of an electronic device associated with the transport unit depending on the result of the detecting or for outputting a signal (e.g. to the electronic device, e.g. via an interface of the electronic device) for changing the operating mode depending on the result of the detecting. These means can, for example, take the form of a processor or a circuit. The processor or circuit can simultaneously also implement the analysis means or, alternatively, differ from a processor or circuit that implements the analysis means.

The electronic device can e.g. be configured for detecting and/or transmission (e.g. for wireless transmission, e.g. via a wireless communications system such as a mobile phone system) of one or more variables regarding the transport unit or regarding one or more transport goods contained in the transport unit (such as current position, current temperature, current humidity, current light exposure, information about vibrations, etc.). This can be done in real time, for example. The electronic device can e.g. be associated with the transport unit by at least temporarily (e.g. at least for the duration of the transport of the transport unit by the vehicle) being fastened within or in, on or on top of the transport unit (e.g. detachably).

The means for changing the operating mode or outputting the signal are e.g. in contact with the detecting means and respond to the detecting result about whether the transport unit is secured by at least one securing means by changing the operating mode or by outputting a signal for triggering the change in operating mode. The detecting result can e.g. state that the transport unit (e.g. at the current time) is secured by at least one securing means or that the transport unit is not secured by at least one securing means. For example, if the system detects that a securement has occurred by at least one securing means, a change in operating mode can be made (or a signal can be output to do this). Another change in operating mode can e.g. occur as soon as the system detects that a securement by at least one securing means is no longer occurring.

In that case, for example, there would be only two operating modes for the electronic device: a first operating mode (e.g. with radio activity) that is active while no securement of the transport unit is detected and a second operating mode (e.g. without radio activity) that is active while the securement of the transport unit by at least one securing means is detected. This causes the adoption of the original operating mode after the transport with the vehicle (e.g. after the end of the flight). The second operating mode can also be active, for example, when it is recognized (e.g. by the apparatus or one of its components) that at least one part of the apparatus (such as the detecting means or a part thereof) is malfunctioning.

Alternatively, when the system detects that a securement by at least one securing means is no longer occurring, no more changes to the operating mode can be induced. Then, for example, the operating mode can only be changed manually at the electronic device and/or depend on additional conditions.

The signal for changing the operating mode can, for example, be a control signal that directly causes the change in operating mode, or it can be an information signal that displays that a change in operating mode is to be carried out.

The change in operating mode can e.g. include switching off the electronic device or deactivating a radio component of the electronic device.

The apparatus thus exploits the fact that the transport unit has to be secured (usually at least against movement relative to the vehicle in the horizontal plane) by securing means before transport starts. Because transport (such as a flight) cannot start before this securement takes place, detecting whether securement (at least relative to one direction) is present is a suitable criterion for changing the operating mode of an electronic device connected to the transport unit if a certain operating mode (such as a standby mode or a mode with deactivated radio) of the device is desired or mandatorily required. Because in an aircraft, the load must be secured before operation of the aircraft, the change of the operating mode (such as deactivation of the radio module) of the electronic device and also the time when this occurs are thus advantageously linked to aviation law regulations.

The detecting of whether securement is occurring can be done in a simple, robust and failsafe manner, as shown below in more detail by example embodiments.

According to an embodiment of the apparatus according to the invention, the detecting means takes the form of a detector that is configured to detect whether a transport unit to be transported by a vehicle is secured, by at least one securing means taking the form of a securement, against a movement in at least one direction relative to the vehicle, and the means for changing the operating mode or outputting a signal for changing the operating mode takes the form of a control configured to change an operating mode of an electronic device associated with the transport unit depending on a result of the detecting, or for outputting a signal for changing the operating mode depending on the result of the detecting. The detector can, as a sensor means, comprise a sensor and, as an analysis means, comprise an analysis unit.

According to an embodiment of the apparatus according to this invention, the detecting means is configured to detect the securement of the transport unit by the securing means on the basis of a contact formed between the securing means and at least a part of the detecting means when the transport unit is secured by the securing means. Via the contact, the detecting means can, for example, detect a property (such as the material of the securing means, or a code that has been attached, or the electric potential of the securing means and possibly of the vehicle connected to the securing means) of the securing means and conclude from that that a securement has taken place or is occurring.

According to an embodiment of the apparatus according to this invention, at least a part of the detecting means is configured to be arranged between the securing means and at least a part of the transport unit via which the securing means secures the transport unit against movement in at least one direction relative to the vehicle. This part of the detecting means can, for example, be at least a part of the sensor means.

According to an embodiment of the apparatus according to this invention, the part of the transport unit is a part of a base plate or a part of a profile formed near the bottom of the transport unit.

According to an embodiment of the apparatus according to this invention, the securing means overlaps the part of the transport unit at least partially (such as in a form-locking manner) when the transport unit is secured by the securing means. The at least partial overlap can, for example, prevent a movement of the transport unit in a vertical direction. The part of the detecting means that is arranged between the securing means and the part of the transport unit by which the securing means secures the transport unit against movement in at least one direction relative to the vehicle can, for example, be arranged at least where the securing means is overlapping the part of the transport unit.

The part of the detecting means can then e.g. be arranged on the part of the transport unit (such as on it with or without fixation deployed). When the part of the transport unit is a base plate or a profile formed near the bottom of the transport unit, the part of the detecting unit can, for example, be arranged on the base plate or profile in an edge area that is overlapped by the securing means when securement occurs. The overlap can, for example, cause a contact to occur between the securing means and the part of the detecting means or cause a force to be exerted by the securing means on the part of the detecting means on the basis of which it is detected that a securement has occurred.

According to an embodiment of the apparatus according to this invention, the detecting means is configured to detect the securement of the transport unit by the securing means on the basis of a force exerted by the securing means on the part of the detecting means arranged between the securing means and the part of the transport unit when the transport unit is secured by the securing means. The force can, for example, cause a deformation of the part of the detecting means (such as a sensor means). The force causes e.g. a change in an electric resistance, electric capacity, electrical inductivity, electrical voltage, magnetic field or pressure. On the basis of this change, for example, the detecting means detects the securement of the transport unit by the securing means.

According to an embodiment of the apparatus according to this invention, at least the part of the detecting means that can be arranged between the securing means and at least the part of the transport unit can be configured in flexible form, e.g. as a belt, cable or conduit. This flexible part of the detecting means can be a sensor means or part thereof. The flexible part can (e.g. in the form of a belt) be equipped with one or more sensors (e.g. of capacitive or piezoelectric type) or itself act as a sensor (e.g. as a touch-sensitive strip or strain gauge). The flexible part can, for example, be an electrical conduit or a conduit filled with a gaseous or liquid medium (such as a tube), e.g. for measuring pressure fluctuations or flow changes. The part of the detecting means can, for example, be so flexible that it e.g. can be guided around the transport unit and/or be deployed on at least a part (such as an edge area of a base plate or of a profile near the bottom) of the transport unit.

One end of the part of the detecting means can, for example, be permanently connected to the apparatus, and the other end of the part of the detecting means can, for example, be connectable to the apparatus in a detachable manner. When the part of the detecting means takes the form, for example, of an electrical conduit, the one end can e.g. be permanently connected electrically to other part of the detecting means (e.g. to an analysis means on the apparatus) while the other end e.g. can be connected by an electrical plug-in connection to the other part of the detecting means. This has the advantage that the loose end, e.g. when the part of the detecting means is deployed on the edge area of a base plate or of a profile near to the bottom of the transport unit, can be guided around the transport unit and then connected to the apparatus.

The part of the detecting means can be configured to be at least partially be fitted into the apparatus or at least partially be rolled up in the apparatus.

According to an embodiment of the apparatus according to this invention, the change of the electronic device's operating mode comprises at least one of the following changes:
  Switching the electronic device on and/or off;
  interruption and/or restoration of a power supply to the electronic device;
  transition to and/or exiting of a standby mode of the electronic device;
  deactivation and/or activation of at least one radio component of the electronic device;
  transition to and/or exiting of a mode in which the electronic device transmits no information or can transmit no information.

According to an embodiment of the apparatus in accordance with this invention, the apparatus comprises means for recognizing whether the apparatus or at least a part thereof (such as the detecting means or a part thereof, such as the sensor means or the analysis means) are malfunctioning, with the means for changing the electronic device's operating mode or for outputting a signal being furthermore configured to change the operating mode depending on a result of the recognition or to output a signal for changing the operating mode depending on the result of the recognition. For example, after recognition that at least one part of the apparatus is malfunctioning, an operating mode that includes no radio activity can be forced or a signal to transition to this operating mode can be output. This ensures that the apparatus, even while at least partially malfunctioning, will take an operating mode suitable for the transport (in aircraft e.g. an operating mode that does not include radio activity).

According to an embodiment of the apparatus in accordance with this invention, the apparatus is a part of the electronic device or is detachably connectable to the electronic device, such as via an electric interface. The apparatus can, for example, be an integral component of the electronic device with which one or more of the variables of the transport unit or of one or more of the transport goods it contains can be determined and wirelessly transmitted. Alternatively, the apparatus can be an autonomous device that is connectable via an (electric) interface to the electronic device to permit influence on the operating mode of the electronic device. In both cases, the apparatus can be a part (integrated or upgraded, for example) of the transport unit (a ULD, for example) or be detachably connectable to the transport unit.

A further example of an apparatus in accordance with this invention comprises means for receiving (such as a receiver) the signal output by the above-described examples of an apparatus in accordance with this invention (or of one of its embodiments) and means (such as a processor) for changing the operating mode of the electronic device on the basis of the received signal. This further apparatus can, for example, be an electronic device or a part thereof. The output signal can, for example, be received via a wireless or wired interface.

An example of a method in accordance with this invention comprises the following steps:

Detecting whether a transport unit to be transported by a vehicle is secured by at least one securing means against a movement in at least one direction relative to the vehicle, and changing an operating mode of an electronic device at least temporarily connected to the transport unit, said change depending on a result of the detecting, or outputting a signal for changing the electronic device's operating mode depending on the result of the detecting.

The method is carried out e.g. by the described example apparatus in accordance with the invention.

An example of a computer program in accordance with the invention comprises program instructions that cause a processor to execute and/or control the steps of the described example method in accordance with this invention when the computer program is running on the processor. The processor can, for example, be a part of the described example of an apparatus in accordance with the invention.

The example computer program in accordance with the invention can, for example, be stored on a data storage medium apparatus. The data storage medium apparatus can, for example, be a computer-readable storage medium that contains the computer program and e.g. takes the form of a magnetic, electric, electromagnetic, optical and/or other type of storage medium.

The features of the described example apparatus in accordance with the invention and its embodiments should also be understood to have been disclosed in all possible combinations with one another. The features described for the example apparatus in accordance with the invention and its embodiments are also (again, in all possible combinations) to be understood to have been disclosed for the further example apparatus in accordance with the invention, for the example method in accordance with the invention, and for the example computer program in accordance with the invention.

Further advantageous example realizations of the invention can be taken from the following detailed description of some example embodiments of the present invention, in particular in connection with the figures. The figures shall only serve for illustration purposes, however, not for determining the invention's scope of protection. The figures are not drawn to scale and are supposed to solely reflect examples of this invention's general concept. In particular, features contained in the figures shall in no way be considered necessary components of this invention.

BRIEF DESCRIPTION OF THE DRAWINGS

In the figures, the following is shown:

FIG. 4a: a flow chart of an example embodiment of a method in accordance with this invention that is carried out by the apparatus in FIG. 3a;

DETAILED DESCRIPTION OF EXAMPLE EMBODIMENTS OF THE INVENTION

FIGS. 1a-1d are schematic illustrations of example embodiments of transport units 4a-4d. Transport units 4a, 4b and 4d are containers, while transport unit 4c is a palette with packages stacked on it and secured by netting. In logistics, transport units of this type are called unit load devices (ULD). As shown by FIGS. 1a-1d, different ULDs exist with standardized dimensions; this is particularly true for the dimensions of the base plates. For example, the base plates of ULDs 4a and 4c have the same dimensions (96"×125"), and the base plates of ULDs 4b and 4d also have the same dimensions (88"×125").

ULDs 4a-4d can, for example, be transported on freight planes (or also in cargo compartments of passenger planes). For this purpose, the cargo compartment's floor is usually equipped with a number of embedded rolls or balls on which the ULDs can be moved in a rolling fashion during loading. When a ULD has reached the position defined for it (such as in accordance with a loading configuration specifically defined for the configuration of the ULDs to be transported), it is secured by securing means against horizontal and possibly also vertical movement relative to the aircraft because such movement by the ULDs during the flight could have catastrophic effects on the flight behavior and could in particular cause damage to the ULDs and also to the aircraft.

The securing means, such as securement catches or securement clips, can, for example, be inserted on all four sides immediately adjacent to the base plate of the ULD into predefined openings in the cargo compartment floor and then stick out of the floor in such a way that they limit or completely prevent movement of the ULD in all four horizontal directions. The securing means can also be permanently installed in the cargo compartment floor and then, by folding up or driving up, be brought into a position in which they stick out above the surface of the cargo compartment floor (i.e. also above the rolls and/or balls) and thus accordingly limit the movement of the ULD. The folding up or driving up of the ULDs can e.g. be done manually (such as by a foot switch) or also automatically. In a raised or inserted status, the securing means can furthermore at least partially overlap the base plate of the ULD to also prevent a movement of the ULD in the vertical direction.

Figure 1A:
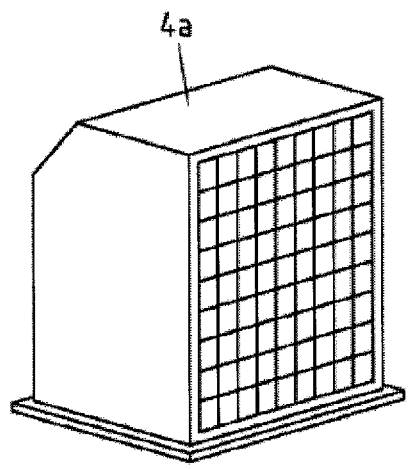
FIGS. 1a-1d: Schematic drawings of example embodiments of transport units.
Figure 1B:
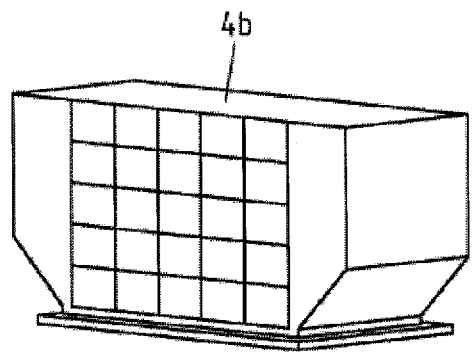
Figure 1C:
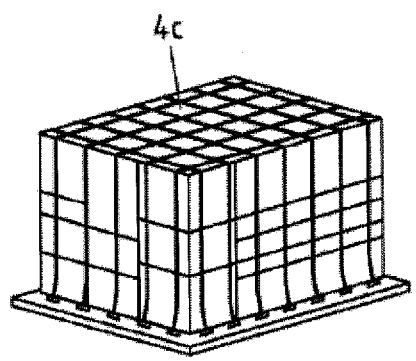
Figure 1D:
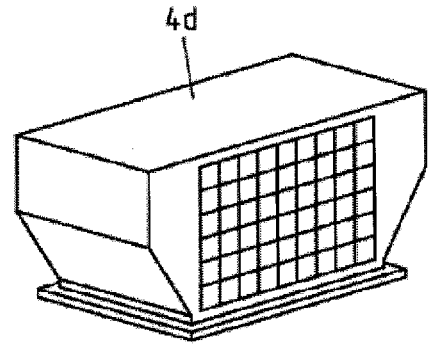
Figure 2A:
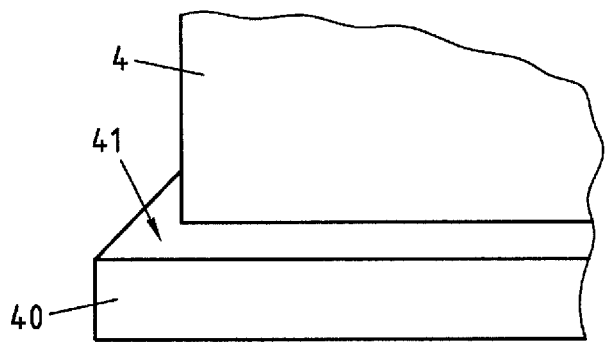
FIG. 2a: a schematic detail view of a part of a base plate of a transport unit in unsecured status.

FIG. 2a shows a schematic illustration of one part of a ULD 4 (e.g. from one of ULDs 4a-4d in FIGS. 1a-1d) in unsecured status. Base plate 40 of ULD 4 has a surface 41 that forms a circumferential edge. The geometric shape of the edge is preferentially identical for all ULDs in order to enable the use of uniform securing means.

Figure 2B:
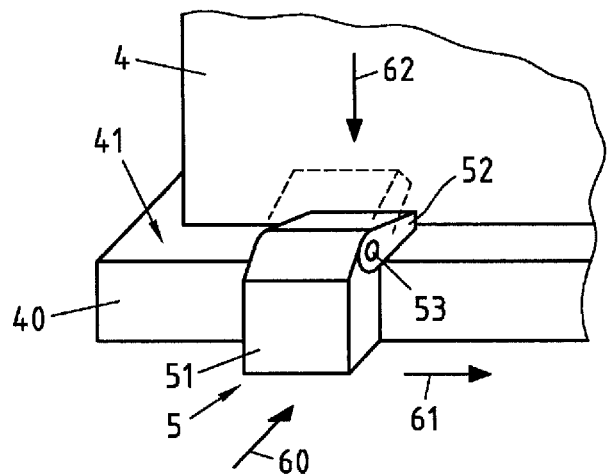
FIG. 2b: a schematic detail view of a part of a transport unit secured by an example securement clip.

FIG. 2b illustrates the securement of the ULD of FIG. 2a by a securing means 5, embodied here as a securement clip with a body 51 and, opposite body 51, an arm 52 that can be swiveled via a hinge 53. Securement clip 5 is at least detachably connected to the aircraft's cargo compartment floor, which is located under the ULD. Securement clip 5 is configured to be moved towards base plate 40 (arrow direction 60, e.g. on a guide rail built into or connected to the cargo compartment floor) and then immobilized (e.g. by a spring or locking device) in order to prevent by this means a movement of ULD 4 in the direction opposite to the direction of arrow 60. Optionally, securement clip 5 can also be movable in a direction parallel to base plate 40 (or be insertable into predefined openings in the cargo compartment floor along base plate 40), as indicated by arrow 61. Arm 52 of securement clip 5 can furthermore be swiveled down from a position shown by dotted lines into a position shown by solid lines and locked in this position (arrow direction 62), in order to then prevent a movement of ULD 4 opposite to the direction of arrow 62.

In this position, arm 52 of securement clip 5 thus overlaps base plate 40; securement clip 5 thus clasps at least a part of the base plate in a form-locking manner.

An effective securement of ULD 4 against movements in all four horizontal directions and against a movement in a vertical direction (upwards in other words; downward movement is prevented by the cargo compartment floor and/or its embedded rolls or spheres) is achieved by attaching at least one securement clip 5 to each of the four sides of the rectangular base plate 40 of ULD 4. Of course, more than one securement clip 5 can be attached to each side of base plate 40.

Figure 2C:
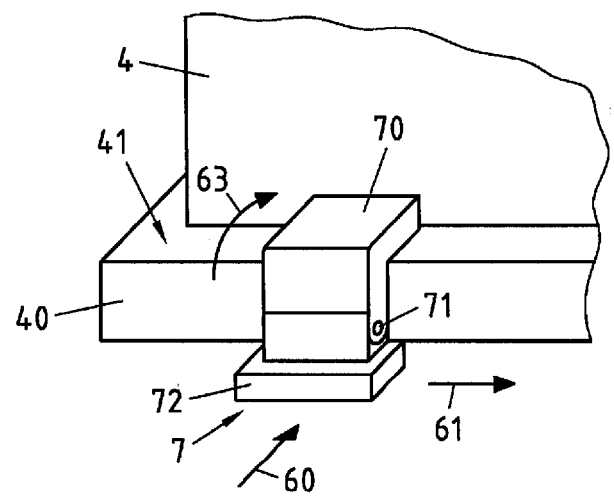
FIG. 2c: a schematic detail view of a part of a transport unit secured by an example securement catch.

FIG. 2c shows an alternative securing means that takes the form in this case of securement catch 7. The securement catch comprises an angled arm 70 that at least partially matches the geometry of edge 41 of base plate 40. Arm 70 can, via a hinge 71 opposite a base plate 70, which is at least detachably connected to the cargo compartment floor, be raised from a position in which it is down in the cargo compartment floor up into a vertical position shown in FIG. 2c (as indicated by arrow 63) and then locked to secure ULD 4 against a movement that is upward and against the direction of arrow 60. Securement catch 7 can again be moved in the direction of arrow 60 toward base plate 40 of ULD 4 (e.g. via a rail system in the cargo compartment floor) and can be locked in this position (e.g. by a spring or locking device) and optionally also can also be moved or pushed in the direction of arrow 61. Securement catch 7 of FIG. 2c can also advantageously be used on all four sides of base plate 40 for securement purposes.

Example embodiments of this invention concern the automatic switch-off or operating mode change of electronic devices, such as devices that serve to track the position of ULDs and/or transmit variables affecting the ULD such as temperature, vibrations, etc. An automatic switch-off is for example urgently necessary when such devices are attached to ULDs that are to be transported in aircraft because the operation of these devices, radio operation in particular, can interfere with aircraft electronics. When no reliable method for switching off or changing the operating mode can be demonstrated, aviation authorities can refuse to license such devices for air transport. The switch-off or operating mode change can also be advantageous for transport of ULDs in other vehicles, however, because during the transport the transmission of position data or variables of the ULD can be taken over by the transporting vehicle.

This means the device can e.g. save power and thus extend its operating time.

This invention takes advantage of a physical commonality in the process of aircraft loading, namely the above-described mandatory necessity of securing the ULDs in the aircraft by securing means before takeoff against shifting in all four directions by activating securing means on all four sides of the ULD (this applies to transport in both freight planes and passenger planes). The securement verification is done by the loading foreman or loading personnel and can e.g. be a prerequisite for clearance to start.

This quasi-standard can be exploited for the automatic switch-off or operating mode change of electronic devices in or attached to the ULD.

Figure 3A:
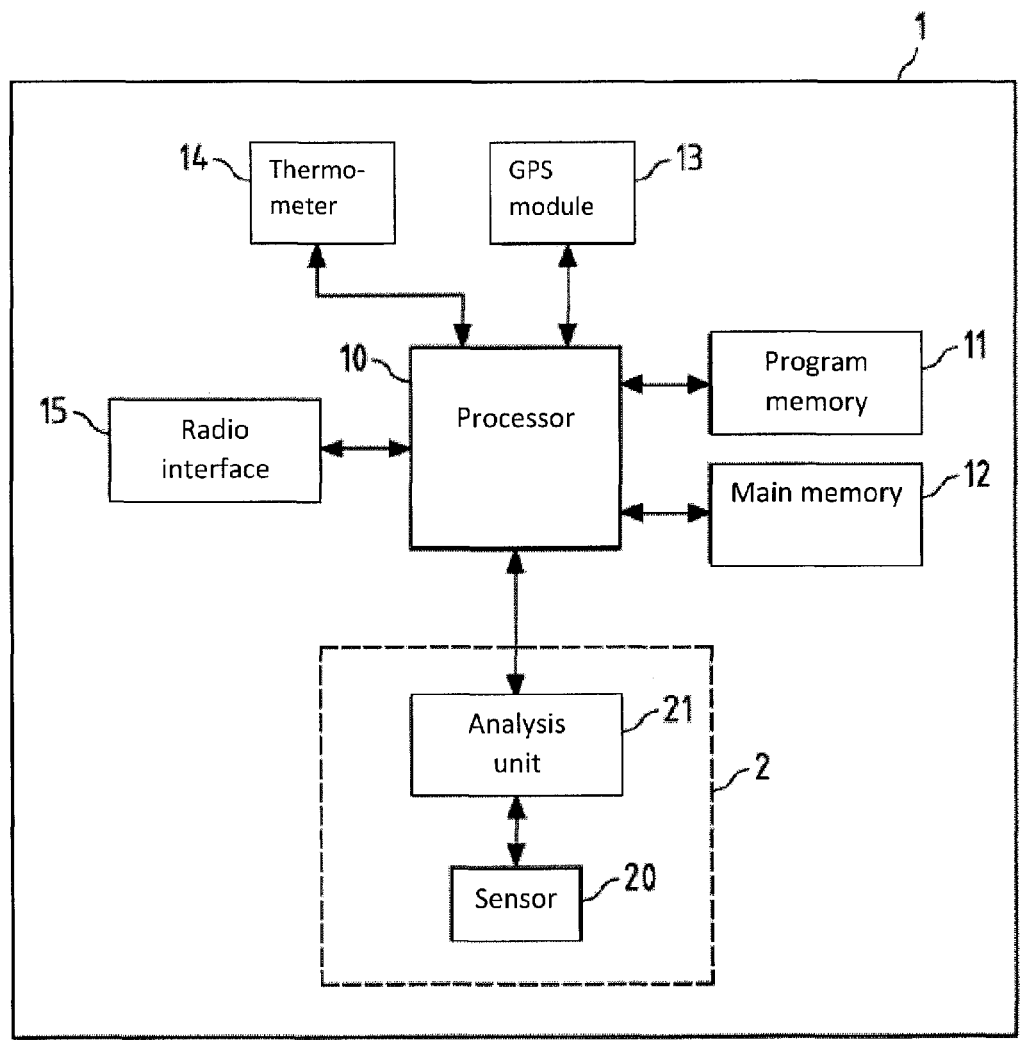
FIG. 3a: a block diagram of an example embodiment of an apparatus in accordance with this invention that is integrated into an electronic device.

This is done in the form of (automatically) detecting whether the ULD is (or has been) secured by at least one securing means against a movement in at least one direction relative to the aircraft and by changing an operating mode of the electronic device depending on the result of the detecting or by outputting a signal to change the operating mode depending on the result of the detecting. FIG. 3a shows in this respect a block diagram of an example embodiment of an apparatus 1 in accordance with this invention that is integrated into an electronic device. Apparatus 1 is controlled by a processor 10. Processor 10 executes program instructions of a computer program that is stored in program memory 11. Main memory 12 serves e.g. as working memory and/or to save data measured by the apparatus (positions, temperatures, etc.). The apparatus in this example case has a GPS (global positioning system) module 13 with which the apparatus can determine its current position on the basis of a satellite-based positioning system. Of course, the GPS module can additionally or alternatively use other positioning systems, such as positioning by means of the Galileo or GLONASS system or on the basis of cellular mobile phone systems. Moreover, apparatus 1 has a temperature sensor 14 to detect the environmental temperature. Via a radio interface, such as corresponding to a (e.g. cellular) mobile radio system, apparatus 1 is able to transmit detected data, in this case e.g. the current position and current temperature, to a detection instance, such as a server. This can happen e.g. in regular intervals or only upon request. The transmission can e.g. only occur when the detected data exceed defined limits, such as a predefined maximum permissible temperature.

These data can then be called up from the detection instance e.g. by a logistics provider responsible for the transport of the ULD with which apparatus 1 is associated or a customer whose goods are being transported in the ULD.

Apparatus 1 is furthermore equipped with detecting means 2 that in this case e.g. comprise a sensor 20 and an analysis unit 21. The functionality of this analysis unit 21 can in this case also be entirely or partially taken over by processor 10. Sensor 20 is configured to detect whether the ULD with which apparatus 1 is associated is secured by at least one securing means. This can be done by a variety of methods. For example, sensor 20 can take the form of a cable that is arranged on the base plate of the ULD in such a way that when the ULD has been secured by a securing means the cable is deformed (is squeezed for example) which changes one or more of its physical properties, such as its electric resistance. Analysis unit 21 is connected to sensor 20 and analyzes the measurements of sensor 20 in order to decide whether a securement of the ULD was actually detected (such as when a measurement signal from sensor 20 exceeds a predefined threshold). Analysis unit 21 can also serve as a driver unit for sensor 20. When sensor 20 is used to measure the change in electric resistance, analysis unit 21 can, for example, be configured to supply voltage to sensor 20, which in this case takes the form of a cable or conduit, in order to use the voltage and current to draw conclusions about the resistance. Alternatively, sensor 20 can also take the form of a tube and then, e.g. via analysis unit 21, the system can draw conclusions about the successful securement on the basis of a change in flow behavior of a medium through the tube when the tube is deformed.

Analysis unit 21 of detecting means 2 responds to a detected securement by outputting a signal to processor 10 that then, on the basis of that signal, changes the operating mode of apparatus 1. For example, apparatus 1 can be transitioned to a standby mode or radio interface 15 can be deactivated or the transmission of data via radio interface 15 can be stopped. In addition, the change in operating mode can also be displayed optically or acoustically by apparatus 1 in order to e.g. allow for an additional verification that the change in operating mode actually took place. For example, upon transition to standby mode a red light can be activated on the device that remains illuminated throughout the entire standby mode.

Analysis unit 21 (or processor 10) can furthermore be configured to check the correct functioning of sensor 20 and/or detecting means 2.

For example, when damage to sensor 20 or detecting means 2 is detected, the system can automatically trigger a change in operating mode (such as switching off or transitioning to a standby mode) for apparatus 1. Damage can be detected, for example, by no more electricity flowing through the electric conduit, in cases when sensor 20 takes the form of an electric conduit. A transition to an active operating mode can, for example, only become possible again after the electric conduit is replaced.

Apparatus 1 according to FIG. 3a can, for example, be subsequently attached to a ULD to be monitored and contains both the monitoring components and the components for automatically switching off or changing the operating mode.

Figure 4A:
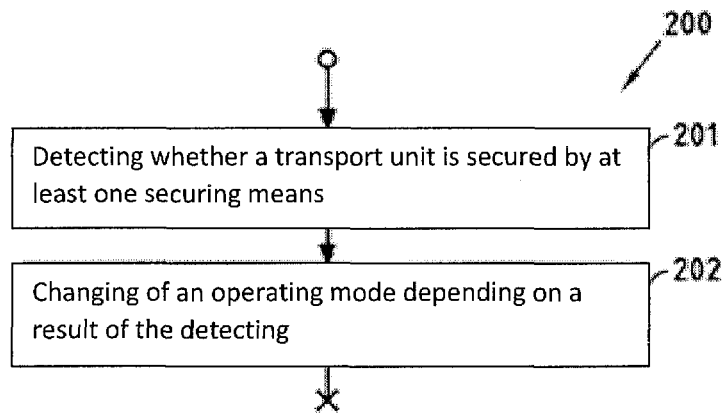

Operation of apparatus 1 corresponds to the process steps 201-202 in the flow chart 200 of FIG. 4a. Process step 201 (detecting whether a securement has occurred) is controlled e.g. by processor 10 (e.g. by regularly querying detecting means 2). Process step 202 (changing the operating mode) is carried out e.g. by processor 10.

Figure 3B:
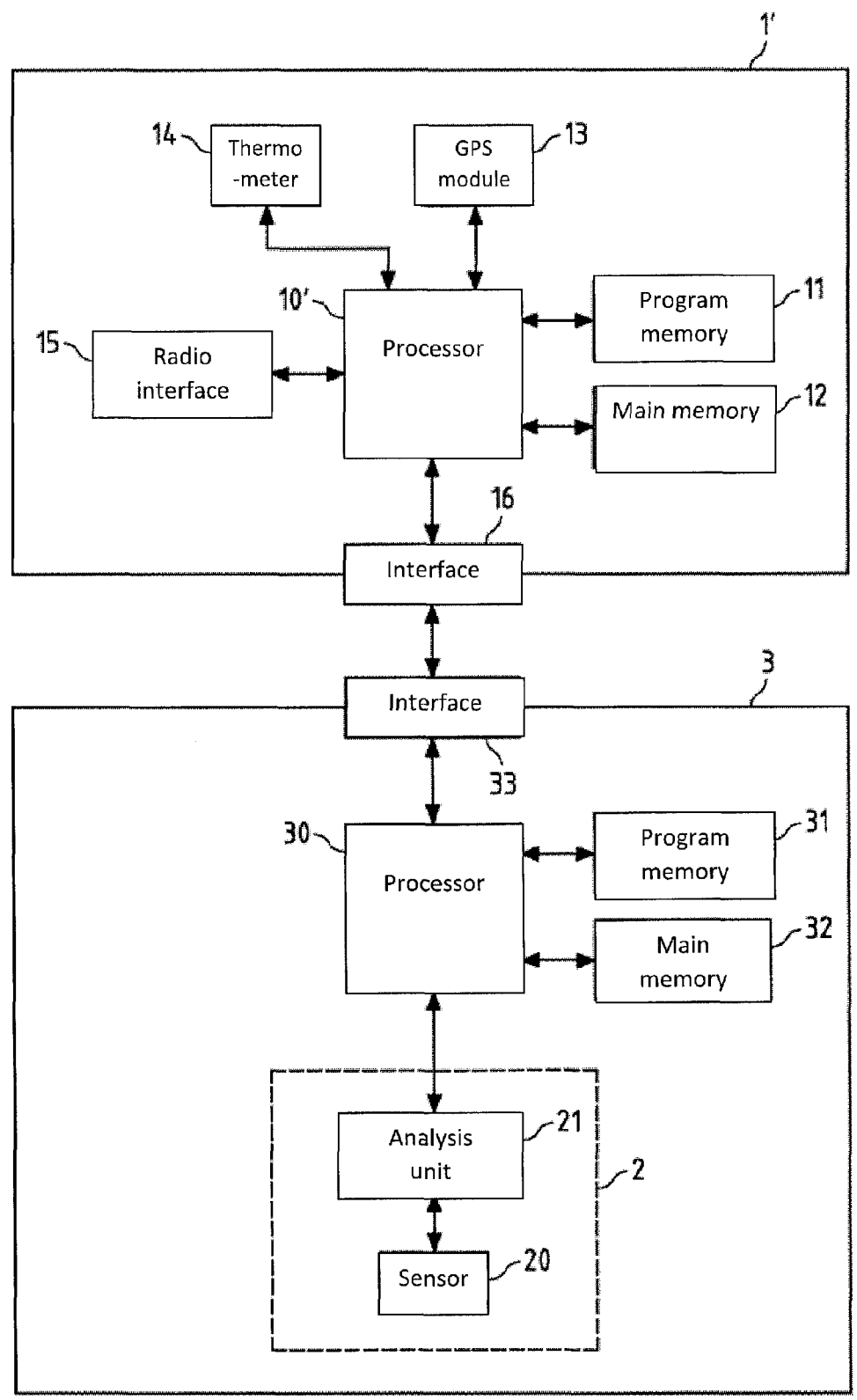
FIG. 3b: a block diagram of a further example embodiment of an apparatus in accordance with this invention that communicates with an electronic device via an interface.

FIG. 3b shows an alternative embodiment of an apparatus 3 in accordance with this invention that uses an interface to communicate with an electronic device 1. In this case the components, which have the same reference IDs as in FIG. 3a, match the components shown and described there.

In FIG. 3b electronic device 1' in turn comprises a processor 10' with program memory 11 and main memory 12. Processor 10' has been modified from processor 10 in FIG. 3a, however, because it no longer communicates directly with detecting means 2, using instead an interface 16. Electronic device 1' comprises moreover a temperature sensor 14 and a GPS module 13 for detecting the current temperature and current position, and a radio interface 15 for transmitting the detected data to a data sink.

In FIG. 3b detecting means 2 are no longer part of electronic device 1', but instead have been put in a separate device 3 that comprises a controlling processor 30 with assigned program memory 31 and main memory 32. In place of processor 30 and assigned memory 31 and 32, a logic circuit can also be provided as an alternative. The functionality of the analysis unit can entirely or partially be taken over by processor 30. Detecting means 2 comprise in turn a sensor 20 and an analysis unit 21 with the same function as described for FIG. 3a. When detecting unit 2 detects that a securement of a ULD has occurred with which apparatus 3 is associated, it outputs a corresponding signal to processor 30. Processor 30 then uses interface 33 to output a signal to electronic device 1', which is supposed to initiate a change in the operating mode of electronic device 1'.

To do so, processor 10' of electronic device 1' receives the signal via interface 16 and carries out the operating mode change correspondingly. Interface 16/33 is preferentially a wired interface, such as a coupling consisting of a plug and socket.

In one possible usage scenario for apparatus 3 from FIG. 3b, apparatus 3 is permanently connected to a ULD (e.g. already during manufacture or alternatively by means of an upgrade). When an electronic device 1' is to be associated with the ULD, e.g. as a tracking/telematic device, electronic device 1' can be attached to the ULD (e.g. detachably) and connected via interface 16 to interface 33 of apparatus 3. Electronic device 1' can be attached to the ULD e.g. by plugging electronic device 1' into apparatus 3 and by doing so connecting interfaces 16 and 33.

Figure 4B:
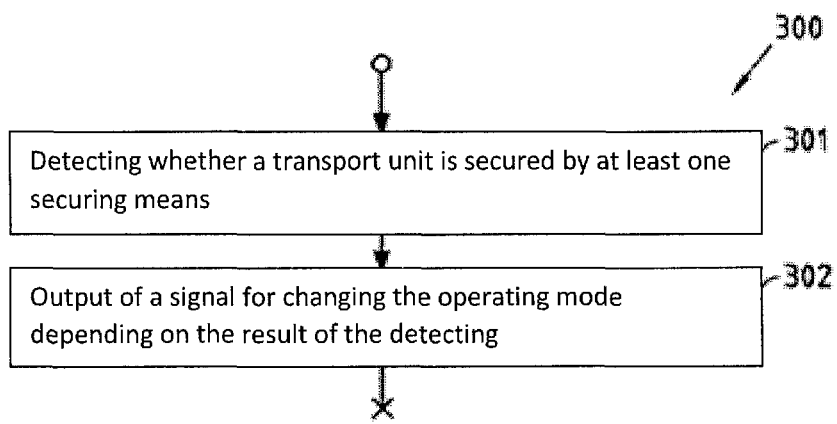
FIG. 4b: a flow chart of a further example embodiment of a method in accordance with this invention that is carried out by the detecting means in FIG. 3b.

Operation of apparatus 3 corresponds to the process steps 301-302 in the flow chart 300 of FIG. 4b. Process step 301 (detecting whether a securement has occurred) is e.g. controlled by processor 30 (such as by regularly querying detecting means 2) or carried out by processor 30 (when the functionality of analysis unit 21 is formed by processor 30). Process step 302 (outputting the signal to change the operating mode) is e.g. carried out by processor 30.

Figure 5:
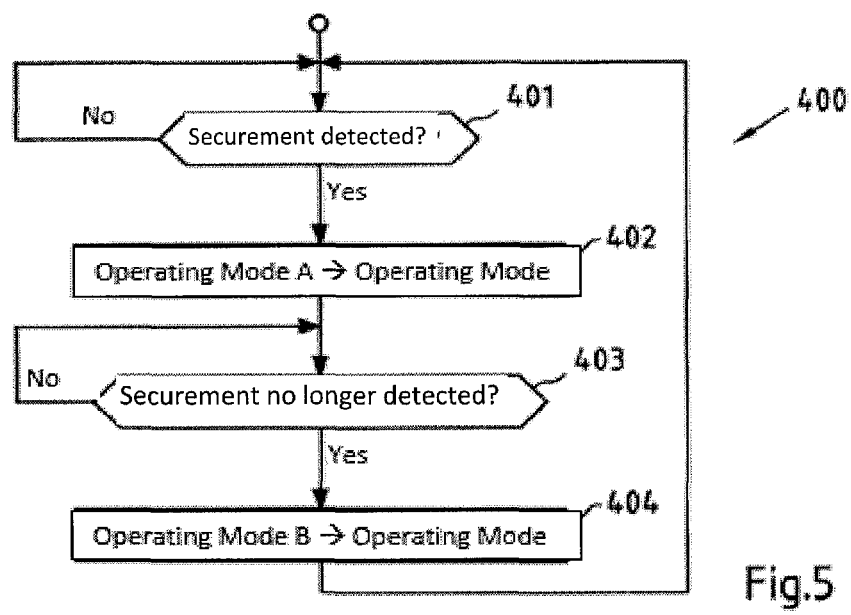
FIG. 5: a flow chart of a further example embodiment of a method in accordance with this invention that is carried out by the apparatuses of FIG. 3a or 3b.

FIG. 5 shows a flow chart of a further embodiment of a method in accordance with this invention that can be carried out by apparatus 1 of FIG. 3a or apparatus 3 of FIG. 3b. In this example embodiment not only the operating mode of electronic device 1/1' is changed when securement is detected but also this operating mode is then exited again when the system determines that the securement is no longer occurring. The method can again be controlled or executed by processors 10 and 30 of apparatuses 1 and 3.

In a step 401, the system checks whether a securement of the ULD by at least one securing means was detected. If that is not the case, the test is repeated in an infinite loop until a securement is detected. In this case, step 402 is executed and either the operating mode is changed from a first operating mode A (such as an operating mode that includes radio operation) to a second operating mode (such as an operating mode that does not include radio operation) (apparatus 1) or this change is triggered by outputting a signal (apparatus 3).

Next, in a step 403, the system checks whether a securement of the ULD by at least one securing means is still occurring. If that is the case, the system uses an infinite loop to keep checking whether that is still true. If not, step 404 is carried out and operating mode B is changed back to operating mode A (apparatus 1), or the change from operating mode B to operating mode A is triggered by outputting a signal.

In step 404, in place of the original operating mode A, a different operating mode C can also be set or triggered, such as an operating mode that initially during operating mode B transmits further data (positions, temperatures) collected by apparatuses 1 and 1' through radio interface 15 to the data receiving terminal (e.g. to avoid creating any position tracking or temperature tracking discontinuities at the data receiving terminal) and only then transition back to an operating mode corresponding to operating mode A.

Figure 6:
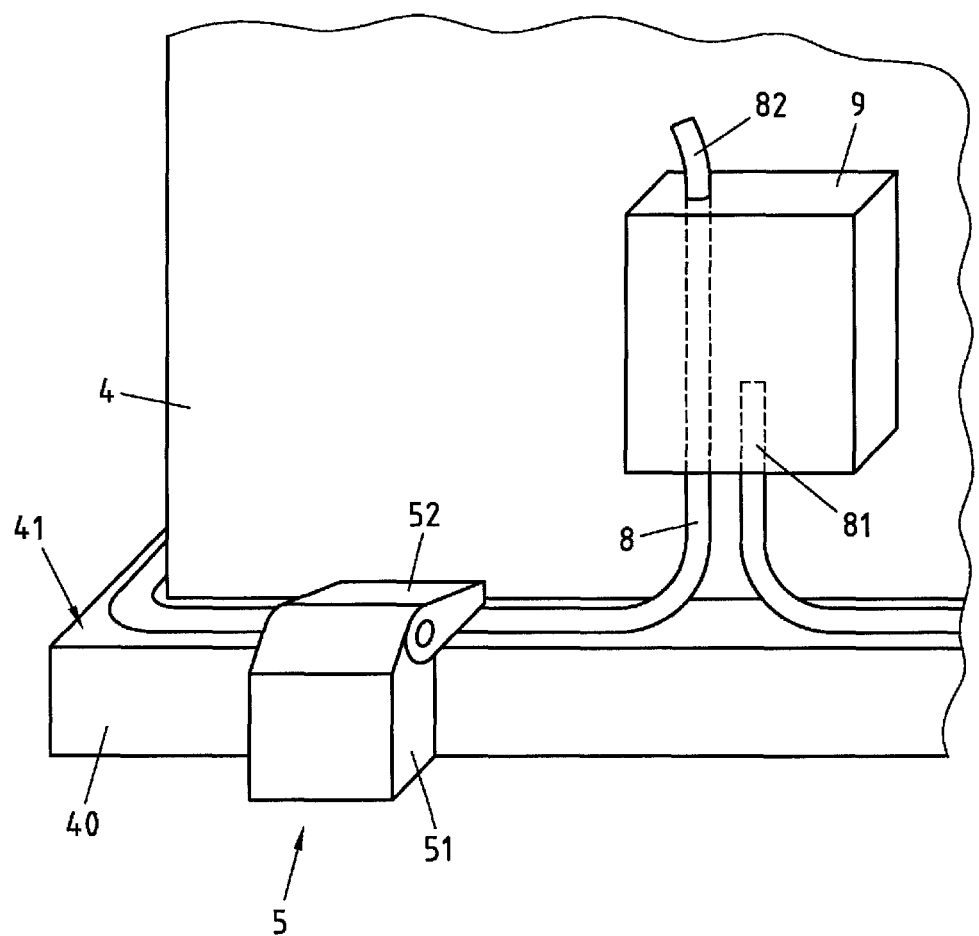
FIG. 6: a schematic detail view of a part of a transport unit that was secured by an example securement clip and an example embodiment of an apparatus in accordance with this invention that was attached to the transport unit to detect the securement.

Finally, FIG. 6 shows a schematic detailed view of a ULD 4 that has been secured by an example securement clip 5 and an example embodiment of an apparatus in accordance with this invention that has been attached to a ULD 4 (such as by insertion into a documents envelope attached to the ULD) to detect the securement.

In the case of the apparatus, this is for example an apparatus 1, as shown in FIG. 3a (alternatively of course it could also be apparatus 3 from FIG. 3b), i.e. with functionality for detecting position and shipment integrity data (such as temperature, vibrations, light exposure, etc.), for radio-based transmission of the detected data to a data sink and for detecting whether ULD 4 is secured by at least one securing means 5. All components shown in FIG. 3a have been put in housing 9, with the exception of sensor 20, which in this example takes the form of a cable 8 and is mostly arranged outside the housing. Analysis unit 21 (cf. FIG. 3a) is thus also in housing 9 and is configured to detect a change in the electric resistance of cable 9 that occurs when cable 8 is compressed at one location at least by arm 52 of securement clip 5 against surface 41 of base plate 40 (because the electric resistance of a conductor is inverse proportional to the conductor's cross-sectional area) and then to transmit a corresponding signal to processor 10 (cf. FIG. 3a) so that it can change the operating mode on the basis of the detected securement. As an alternative to measuring the change in electric resistance, other sensing methods can also be used that are based e.g. on a force or compression effect exerted by securement clip 5 or are based on a contact to securement clip 5. For example, instead of a cable a belt with sensors on or in it can be used, e.g. piezo sensors or capacitive or inductive sensors.

In this example embodiment of FIG. 6 one end 81 of cable 8 is permanently attached to housing 9 (there it can alternatively be detachably attached, however), while the other end 82 is detachably attachable to housing 9.

In this way, for example, when housing 9 is attached to the ULD (e.g. detachably), the loose end 82 can be guided once around ULD 4 with the cable being deployed on surface 41 of the base plate. After completing the walk-around, the loose end 82 can then be inserted into housing 9 (e.g. such that the cable is kept under tension) and connected electrically to analysis unit 20 (cf. FIG. 3a), e.g. via a plug connection (not shown in FIG. 6). From this moment in time onward, the system can detect whether ULD 4 has been secured by a securement clip 5.

Cable 8 can be at least partially rolled up inside housing 9 (such as at end 81, such as with a lockable system that automatically winds up the cable), so that, even when ULD 4 has different dimensions, only enough of cable 8 is pulled out of housing 9 as is required to place cable 8 on circumferential edge 41 and no loops form that might impair the functioning of the detecting of the securement.

Cable 8 can advantageously be at least partially flat in shape (in other words with a longish rather than circular cross-section) in order to allow it to lie flat on circumferential edge 41. It can also have a surface structure or be subjected to means that prevent slippage on edge 41. For example, this can be accomplished by means for at least partial adhesion of the cable 8 to the edge 41 (e.g. by attaching adhesive labels or double-sided adhesive tape to cable 8). When the base plate of ULD 4 consists at least partially of magnetic materials, means for magnetically fixing cable 8 to edge 41 can also be applied to cable 8. In general, suitable positioning of cable 8 on edge 41 can be supported by pulling cable 8 tight after cable 8 has gone around ULD 4.

Cable 8 is preferentially robust in design so that it is not damaged or destroyed by safety clip 5 even after frequent use. This robustness can for example be ensured by flat design and/or an appropriate casing made of a robust material.

Analysis unit 21 (cf. FIGS. 3a/3b) assigned to cable 8 (which in the present example represents sensor 20 in FIGS. 3a and 3b) can, for example, be configured to output a signal indicating the securement of ULD 4 to processor 10 (FIG. 3a) or 30 (FIG. 3b) when cable 8 is compressed by merely one securement clip 5. Alternatively, however, it can also be configured to output a signal indicating the securement of ULD 4 only after cable 8 has been compressed by two or more (e.g. four) securement clips 5.

This can increase robustness against false alarms because the change in resistance in cable 8 is greater after compression at multiple locations than after compression at only one location.

Once ULD 4 is positioned in the aircraft and securement clips 5 are driven down, they will thus press cable 8 firmly onto ULD 4, causing the electronic device e.g. to switch to standby mode and be safe for flight. After landing and releasing securement clips 5 back to their park position, the electronic device would then e.g. automatically switch back on, as described above for FIG. 5.

When a signal indicating securement of the ULD is output by the detecting means only when a predefined number of securing means have been used (such as a predefined number (such as one or two) of securing means on each of the four sides of the ULD), the output signal used to change the operating mode of the electronic device can additionally or alternatively be used for other purposes as well, such as to control a display associated with the ULD (e.g. attached to it) that—for example for the load foreman—displays that the ULD is now secure, or to transmit to a monitoring unit (such as in the vehicle) that e.g. monitors the securement of all the ULDs loaded in the vehicle and e.g. only releases the transport (e.g. the flight) when signals have been sent for all the ULDs showing that they are secured.

As can be seen from the embodiment in FIG. 6, ULD 4 can be upgraded with the apparatus located in housing 9 and cable 8 (in other words the entire apparatus 1 according to FIG. 3a). Alternatively, however, at least some components such as cable 8 (and if applicable also the components of apparatus 3 in FIG. 3b) can already be permanent parts of ULD 4 (i.e. already be integrated during manufacture of the ULD or be permanently attached once to the ULD after its manufacture), e.g. to ensure especially advantageous positioning of cable 8 on edge 41.

The invention was described using example embodiments. However, the invention is not limited to these concrete embodiments.

The sequence of method steps described in this specification in the individual process diagrams is not mandatory; alternative sequences of process steps are conceivable. The process steps can be implemented in different ways. Thus an implementation in software (by program instructions), hardware or a combination of both is conceivable for the implementation of the method steps.

What is claimed is:
1. An Apparatus, comprising:
 a detector configured to detect whether a transport unit to be transported by a vehicle is secured by at least one securing unit against a movement in at least one direction relative to the vehicle, and
 an operating mode changing unit configured for one of changing an operating mode of an electronic device associated with the transport unit depending on a result of the detecting and outputting a signal for changing the operating mode depending on the result of the detecting,
 wherein the change in the electronic device's operating mode comprises at least one of deactivation and activation of at least one radio component of the electronic device;
 wherein at least a part of the detector is configured to be arranged between the securing unit and at least a part of the transport unit, via which the securing unit secures the transport unit against movement in at least one direction relative to the vehicle;

wherein at least the part of the detector that can be arranged between the securing unit and at least the part of the transport unit is configured in flexible form so that the part of the detector can be guided around the transport unit; and wherein a first operating mode with radio activity is active as long as no securement of the transport unit is detected, and a second operating mode without radio activity is active while the securement of the transport unit by at least one securing unit is detected.

2. The Apparatus according to claim 1, wherein the part of the transport unit is one of a part of a base plate and a part of a profile near the bottom of the transport unit.

3. The Apparatus according to claim 1, wherein the securing unit overlaps the part of the transport unit at least partially when the transport unit is secured by the securing unit.

4. The Apparatus according to claim 1, wherein the detector is configured to detect the securement of the transport unit by the securing unit on the basis of a contact that is formed between the securing unit and at least a part of the transport unit when the transport unit is secured by the securing unit.

5. The Apparatus according to claim 1, wherein the detector is configured to detect the securement of the transport unit by the securing unit on the basis of a force that is exerted by the securing unit on the part of the detector arranged between the securing unit and the part of the transport unit when the transport unit is secured by the securing unit.

6. The Apparatus according to claim 5, wherein the force causes a change in one of an electric resistance, an electric capacity, an electric inductivity, an electric voltage, a magnetic field and a pressure in the part of the detector and wherein securement of the transport unit by the securing unit is detected based on this change.

7. The Apparatus according to claim 1, wherein at least the part of the detector that can be arranged between the securing unit and the part of the transport unit is configured as one of a belt, cable and conduit.

8. The Apparatus according to claim 1, wherein one end of the part of the detector is fixedly connected to the apparatus and the other end of the part of the detector is detachably connectable to the apparatus.

9. An Apparatus, comprising:
a detector configured to detect whether a transport unit to be transported by a vehicle is secured by at least one securing unit against a movement in at least one direction relative to the vehicle, and
an operating mode changing unit configured for one of changing an operating mode of an electronic device associated with the transport unit depending on a result of the detecting and outputting a signal for changing the operating mode depending on the result of the detecting,
wherein the change in the electronic device's operating mode comprises at least one of deactivation and activation of at least one radio component of the electronic device;
wherein at least a part of the detector is configured to be arranged between the securing unit and at least a part of the transport unit, via which the securing unit secures the transport unit against movement in at least one direction relative to the vehicle;
wherein at least the part of the detector that can be arranged between the securing unit and at least the part of the transport unit is configured in flexible form so that the part of the detector can be guided around the transport unit; and
wherein the change in the electronic device's operating mode comprises at least one of the following changes:
Switching the electronic device at least one of on and off;
at least one of interruption and restoration of a power supply to the electronic device;
at least one of transition to and exiting of a standby mode of the electronic device; and
at least one of transition to and exiting of a mode in which one of the following holds for the electronic device: it transmits no information, and can transmit no information.

10. The Apparatus according to claim 1, wherein one of the following holds for the apparatus: the apparatus is a part of the electronic device, or the apparatus is detachably connectable to the electronic device.

11. The Apparatus according to claim 1, wherein one of the following holds for the apparatus: the apparatus is a part of the transport unit, or the apparatus is detachably connectable to the transport unit.

12. A Method comprising:
detecting, with a detector, whether a transport unit to be transported by a vehicle is secured by at least one securing unit against a movement in at least one direction relative to the vehicle, and
one of changing an operating mode of an electronic device associated with the transport unit, depending on a result of the detecting and outputting a signal for changing the operating mode of the electronic device, depending on the result of the detecting,
wherein the change in the electronic device's operating mode comprises at least one of deactivation and activation of at least one radio component of the electronic device;
wherein at least a part of the detector is configured to be arranged between the securing unit and at least a part of the transport unit, via which the securing unit secures the transport unit against movement in at least one direction relative to the vehicle;
wherein at least the part of the detector that can be arranged between the securing unit and at least the part of the transport unit is configured in flexible form so that the part of the detector can be guided around the transport unit; and
wherein a first operating mode with radio activity is active as long as no securement of the transport unit is detected, and a second operating mode without radio activity is active while the securement of the transport unit by at least one securing unit is detected.

13. The Method according to claim 12, wherein the securing unit overlaps the part of the transport unit at least partially when the transport unit is secured by the securing unit.

14. The Method according to claim 12, wherein the detector is configured to detect the securement of the transport unit by the securing unit on the basis of a contact that is formed between the securing unit and at least a part of the transport unit when the transport unit is secured by the securing unit.

15. The Method according to claim 12, wherein the detector is configured to detect the securement of the transport unit by the securing unit on the basis of a force that is exerted by the securing unit on the part of the detector arranged between the securing unit and the part of the transport unit when the transport unit is secured by the securing unit.

16. The Method according to claim 15, wherein the force causes a change in one of an electric resistance, an electric capacity, an electric inductivity, an electric voltage, a magnetic field and a pressure in the part of the detector and wherein securement of the transport unit by the securing unit is detected based on this change.

17. A data storage medium device storing a computer program comprising program instructions that cause a processor to at least one of execute and control a method according to the following steps when the computer program is running on the processor:

- detecting, with a detector, whether a transport unit to be transported by a vehicle is secured by at least one securing unit against a movement in at least one direction relative to the vehicle, and
- one of changing an operating mode of an electronic device associated with the transport unit, depending on a result of the detecting and outputting a signal for changing the operating mode of the electronic device, depending on the result of the detecting,
- wherein the change in the electronic device's operating mode comprises at least one of deactivation and activation of at least one radio component of the electronic device;
- wherein at least a part of the detector is configured to be arranged between the securing unit and at least a part of the transport unit, via which the securing unit secures the transport unit against movement in at least one direction relative to the vehicle; and
- wherein at least the part of the detector that can be arranged between the securing unit and at least the part of the transport unit is configured in flexible form so that the part of the detector can be guided around the transport unit; and
- wherein a first operating mode with radio activity is active as long as no securement of the transport unit is detected, and a second operating mode without radio activity is active while the securement of the transport unit by at least one securing unit is detected.

18. The Apparatus of claim 1, wherein the at least one securing unit is one of a catch and a clip that is activated when the transport unit has reached a transport position in the vehicle.

19. The method of claim 12, wherein the at least one securing unit is one of a catch and a clip that is activated when the transport unit has reached a transport position in the vehicle.

* * * * *